July 8, 1924. 1,500,145

J. F. O'CONNOR

ANTIFRICTION SIDE BEARING

Filed Dec. 2, 1920

Witnesses
Wm. Geiger

Inventor
John F. O'Connor
By Geo. J. Haight
His Atty.

Patented July 8, 1924.

1,500,145

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

ANTIFRICTION SIDE BEARING.

Application filed December 2, 1920. Serial No. 427,734.

*To all whom it may concern:*

Be it known that I, JOHN F. O'CONNOR, a citizen of the United States, residing at Chicago, in the county of Cook and State of Illinois, have invented a certain new and useful Improvement in Antifriction Side Bearings, of which the following is a full, clear, concise, and exact description, reference being had to the accompanying drawings, forming a part of this specification.

This invention relates to improvements in antifriction side bearings.

In the manufacture, assembling and application of anti-friction side bearings for railway cars, it is well known that considerable annoyance and difficulty is frequently incurred due to the movable anti-friction element proper becoming displaced or lost or incorrectly assembled at the time the bearing is applied to the car, such results arising sometimes from accidents in shipment and occasionally from deliberate tampering. It has been found necessary, from a practical standpoint, to have the side bearing not only properly assembled by the original manufacturer at the place of manufacture but the assembly of the parts made such that they cannot be disarranged or tampered with after the bearings leave the control of the original manufacturer. Various expedients have been devised to meet this situation, some of which have not proven entirely successful and others involving an increased cost sufficient to militate against the successful sale of the bearings in competition with others performing a like function.

The object of my invention is to provide a side bearing construction of economical arrangement so designed, that, when the parts are once properly assembled, all possibility of disarranging the parts is positively prevented unless by deliberate intent involving destruction or mutilation of some part which will be immediately apparent to inspectors.

Figure 1:
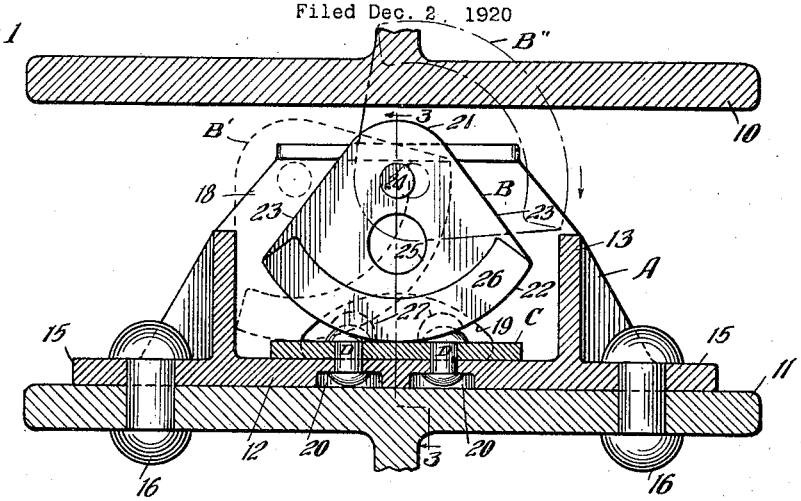
Figure 2:
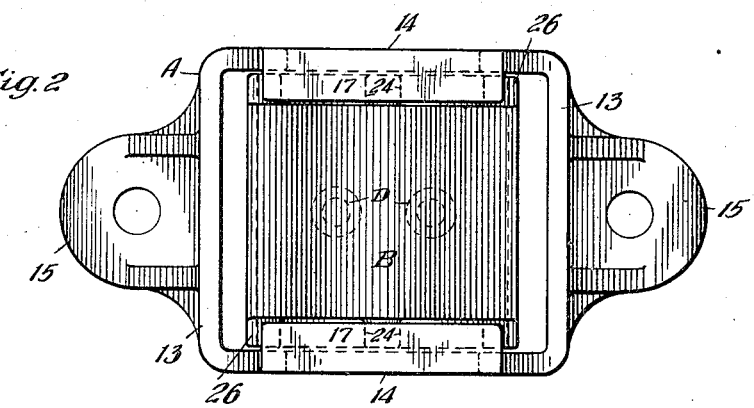
Figure 3:
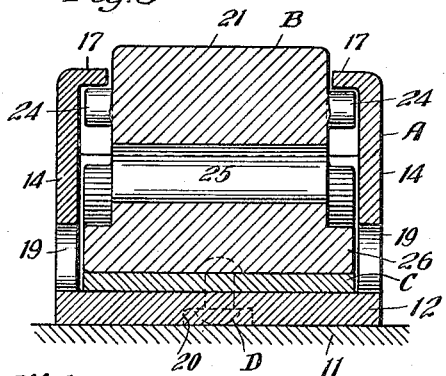

In the drawing forming a part of this specification, Figure 1 is a vertical, sectional view taken parallel to the center line of a car through the ends of body and truck bolsters showing my improvements in connection therewith. The full line position of the anti-friction element proper indicates its normal position when not functioning. The dotted line position of the anti-friction element proper indicates the position assumed by it at its limit of travel to the left as viewed in Figure 1. The dot and dash illustration of the anti-friction element illustrates the manner in which the anti-friction element proper is assembled with the retaining member or base casting, as hereinafter pointed out in detail. Figure 2 is a top plan view of the side bearing illustrated in Figure 1. And Figure 3 is a vertical, sectional view corresponding substantially to the line 3—3 of Figure 1.

In said drawing, 10 denotes the under side of a car body bolster and 11 the upper portion of the opposed truck bolster. In the instance shown, my improved side bearing is applied to the truck bolster. As shown, the side bearing comprises, broadly, a retaining member, housing, or base casting A; an anti-friction element proper B; a bearing plate C; and rivets D—D.

The retaining member A is shown as of rectangular hollow box-like form having a bottom wall 12, vertically extending end walls 13—13, vertically extending side walls 14—14, and perforated end lugs or flanges 15—15 by which the retaining member is adapted to be rigidly secured to the truck bolster as by rivets 16—16. As appears from Figure 1, the end walls 13 are of lesser height than the side walls 14 and the latter are provided along their top edges with inturned integral flanges 17—17. The length of the flanges 17, as shown in Figure 1, is appreciably less than the distance between the end walls 13 so that spaces 18—18 are left between the ends of the flanges 17 and the top edges of the end walls 13. The side walls of the retaining member may be cut away adjacent the bottom of the retaining member as indicated at 19—19 in order to permit dirt and other foreign matter being blown or flushed out. The under side of the bottom wall 12 is suitably recessed as indicated at 20—20 to accommodate the corresponding ends of the rivets D so as to avoid interference with the application of the retaining member to the bolster.

The anti-friction element B which I have shown is of the gravity self-centering rocker type and has an upper cylindrical bearing surface 21 and a lower concentric bearing surface 22 struck on a longer radius. Flat sides 23—23 are preferably arranged tangent to the upper bearing surface 21, said flat surfaces 23 diverging downwardly and intersecting the lower bearing surface 22. Said anti-friction element B is formed with integrally cast laterally extended studs 24—24 at each end of the rocker, said studs being concentrically disposed relative to the common axis or center of the two concentric surfaces 21 and 22. It will be noted from an inspection of Figure 3 that said studs 24 extend beneath the flanges 17 closely adjacent the latter with merely sufficient clearance to avoid binding as the element B rolls back and forth. Due to the fact that the surfaces 21 and 22 are made concentric and the particular location of the studs 24, the latter will travel in a horizontal line as the element B moves back and forth within the limits provided for as shown by the dotted line position B' of the anti-friction element in Figure 1. In order to facilitate the automatic return of the element B to its normal position after each actuation and upon removal of the pressure, said element is preferably cored as indicated at 25 and in addition is provided near the bottom thereof, at each end, with laterally extended arcuate counterweights 26—26. The main part or body of the anti-friction element B is of a length, taken perpendicular to the side walls 14—14, slightly less than the distance between the opposed inner edges of the flanges 17—17, as clearly shown in Figure 3.

The bearing plate C is preferably of hardened steel and is secured to the bottom wall 12 of the retaining member A by the two rivets D—D, as shown. The bottom of the anti-friction element B is provided with recesses 27—27 located to correspond with the upper heads of the rivets D so as to cooperate with the latter in the manner of meshing teeth. With this arrangement, it is evident that the anti-friction element B cannot be shifted bodily with respect to the retaining member A so long as the anti-friction element B proper is in engagement with at least one of the rivets D. To insure that the anti-friction element proper B cannot pass from engagement with either of the rivets D, the end walls 13 are spaced as indicated in Figure 1 so that the flat sides 23 of the element B will come into engagement with said end walls when the flat sides extend vertically as illustrated at B'. Furthermore, the counterweights 26 are made of such length that the ends thereof will preferably engage the flanges 17 when the element B has been moved to either of its extreme positions, as shown at B'.

In carrying out my invention, to obtain a completed article as shown in the drawings, it is necessary to apply at least one of the rivets D after the element B has been positioned within the retaining member A. Both rivets D may be applied after the element B is within the retaining member A although preferably I will secure one of the rivets D and the plate C before inserting the element B. Assuming that the lefthand rivet D, as viewed in Figure 1, has been applied before the element B is inserted within the member A, I introduce the element B within the member A as shown by the dot and dash position B'' of the anti-friction element. The studs 24 may be moved horizontally beneath the flanges 17 until the element assumes the position B''. The latter is then swung downwardly, it being observed that there is sufficient clearance in the openings 18 to permit the counterweight flanges 26 to swing in an arc therethrough. The anti-friction element then being within the member A, is engaged with the lefthand rivet D, put in place and rocked to the position B'. This leaves exposed the openings for the righthand rivet D and permits of the application of the latter, one of the tools required in heading the rivet being inserted through the top of the member A. After the second rivet D is in place, it is then impossible to remove the anti-friction element since it can never pass beyond a position corresponding to that indicated at B' in Figure 1.

I have herein shown and described what I now consider the preferred manner of carrying out the invention but, as will be obvious to those skilled in the art, various changes and modifications may be made without departing from the spirit of the invention and all such changes and modifications are contemplated that come within the scope of the claims appended hereto.

I claim:

1. In an anti-friction side bearing, the combination with a retaining member open at the top having a bearing surface therein and provided with spaced end and side walls, said side walls having continuous inturned flanges along their edges remote from the bearing surface terminating short of the respective end walls, thereby restricting said top opening between said flanges; of an anti-friction element adapted to roll back and forth within said member, said element having integral studs at its ends, the overall distance from end to end of said studs being greater than the width of the restricted portion of the top opening and less than the distance between said side walls, said studs always extending under said flanges in any position of said element within its limits of travel; and means for limiting the travel of said element including a plurality of spaced lugs projecting from said bearing surface within said retaining member, said element having corresponding recesses cooperable with said lugs to thereby prevent bodily shifting of said element with respect to the retaining member, at least one of said lugs and the anti-friction element remaining in operative relation in any possible position of said element within its limits of travel.

2. In an anti-friction side bearing, the combination with a retaining member having a bearing surface therein and provided with spaced side walls, the latter having inturned flanges along their edges remote from the bearing surface; of a gravity self-centering anti-friction element adapted to roll back and forth within said member, said element having a stud at each end thereof rigidly associated therewith, said studs always extending beneath said flanges in any position of said element within its limits of travel, said element being provided also with arcuate counterweights at its bottom at each end thereof also disposed beneath said flanges; and cooperating tooth-acting means on the bottom of the anti-friction element and the retaining member adapted to prevent bodily shifting of said element with respect to the retaining member, the ends of said counterweights being adapted to engage said flanges at the limits of travel of the anti-friction element within the retaining member while a portion of said cooperating means is also in engagement.

3. In an anti-friction side bearing for railway cars, the combination with a retaining member having a horizontally extending bearing surface, spaced end walls and spaced side walls extending vertically relatively to the bearing surface, said side walls having inturned continuous flanges along their edges remote from the bearing surface and spaced at a greater distance from the bearing surface than the top edges of said end walls; of an anti-friction element adapted to roll back and forth within said retaining member, said end walls limiting the travel of said element with respect to the retaining member, said element being provided with a stud at each end thereof extending under and in close proximity to the relative flange, of a side wall at all times within the limits of travel of said element within the retaining member, the spacing between said flanges and the top edges of said end walls permitting assembling therethrough of said anti-friction element with its studs; and cooperating inter-engaging means between said element and the retaining member located at the bearing surface, said means being arranged to prevent bodily shifting of said element with respect to the retaining member and having at least a portion thereof always in cooperating engagement within the limits of travel of the element.

4. In an anti-friction side bearing, the combination with a hollow retaining member adapted to be secured to a truck bolster of a car, said member having a bottom bearing surface, vertically extending end walls and vertically extending side walls, the latter having inturned flanges along their top edges disposed above the top edges of the end walls, of a gravity self-centering anti-friction element within said retaining member, said element having integrally formed studs extended from the ends thereof and positioned beneath said flanges during all positions of the element within its limits of movements, said element having also arcuate counterweights extended from each end thereof at its bottom, said counterweights being positioned beneath said flanges; and a plurality of tooth-like projections extending upwardly from the bottom bearing surface of the retaining member, said anti-friction element having cooperating recesses, at least one of said projections being in engagement with the anti-friction element in any position of the latter within its limits of travel.

5. In an anti-friction side bearing, the combination with a housing having a bearing surface therein and provided with spaced side walls; of an anti-friction element adapted to roll back and forth within said housing on said surface between said side walls, said element having side projections thereon and said side walls having inwardly projecting ledges overhanging said side projections and coacting therewith to retain said element within the housing, each of said ledges being cut away to provide a passage to permit entrance of said projections during insertion of said element while assembling the side bearing; and coacting means on said housing and element for restricting the latter to rolling movement and limiting the rolling movement thereof to prevent registration of said projections with said passages, said last named means including a member coacting with said element and adapted to be secured in position within the housing after insertion of said element.

6. In an anti-friction side bearing, the combination with a housing having a bearing surface therein and provided with spaced side walls; of an anti-friction element adapted to roll back and forth within said housing on said surface between said side walls, said element having side projections thereon, said side walls being provided with retaining means overhanging said side projections, and said housing having a passageway therein, adapted to permit entrance of said projections during insertion of said element while assembling the side bearing; and coacting means on said housing and element for restricting the latter to rolling movement and limiting the rolling movement thereof to prevent registration of said projections with said passageway.

In witness that I claim the foregoing I have hereunto subscribed my name this 30th day of Oct. 1920.

JOHN F. O'CONNOR.

Witnesses:
META SCHMIDT.
UNA C. PERIN.